Dec. 16, 1958
H. LOTZ
2,864,423
SNOW AND ICE CLEAT
Filed Dec. 18, 1956
2 Sheets-Sheet 1
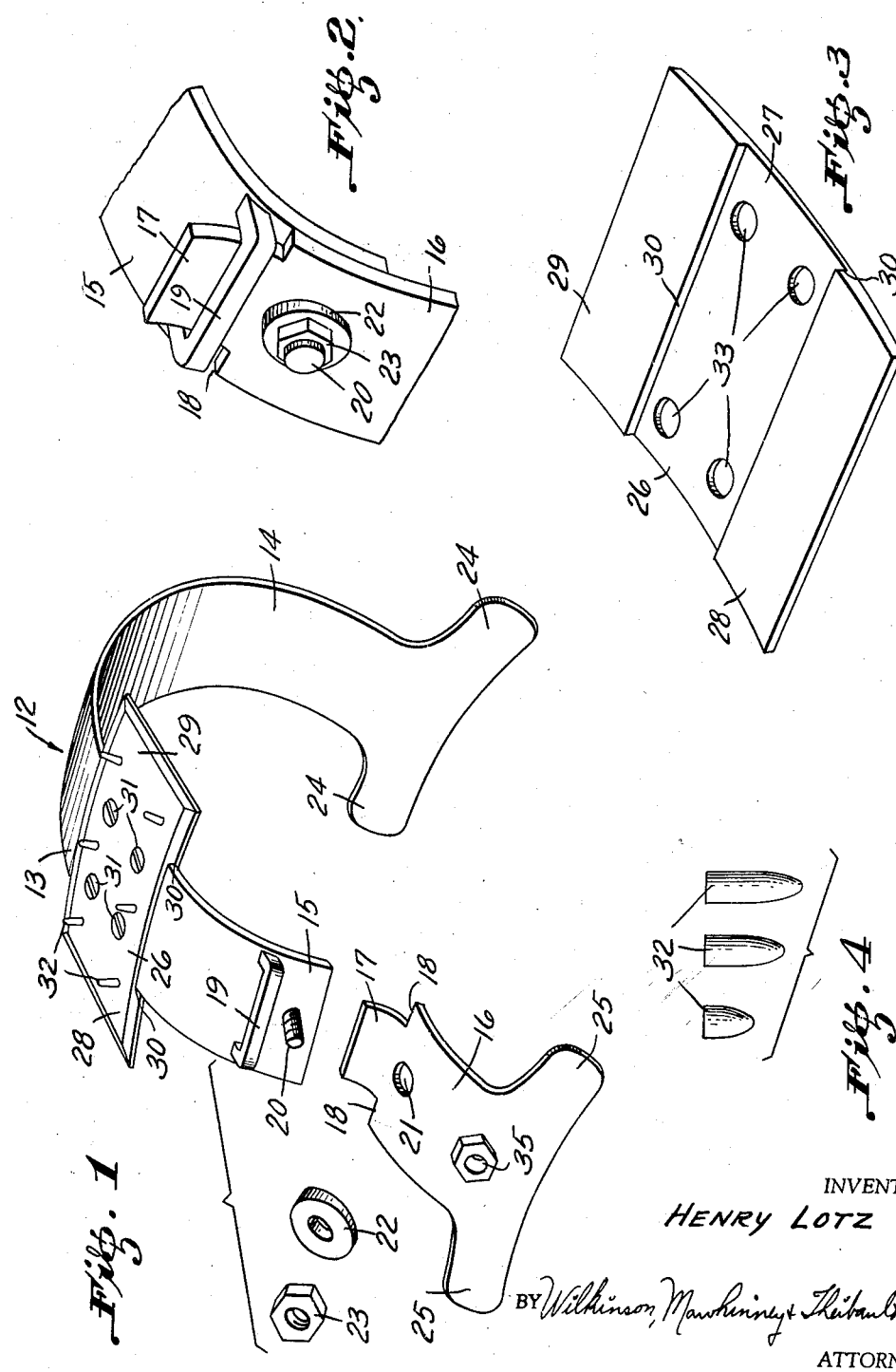
INVENTOR
HENRY LOTZ
BY Wilkinson, Mawhinney & Thibault
ATTORNEYS Dec. 16, 1958 H. LOTZ 2,864,423
SNOW AND ICE CLEAT
Filed Dec. 18, 1956 2 Sheets-Sheet 2
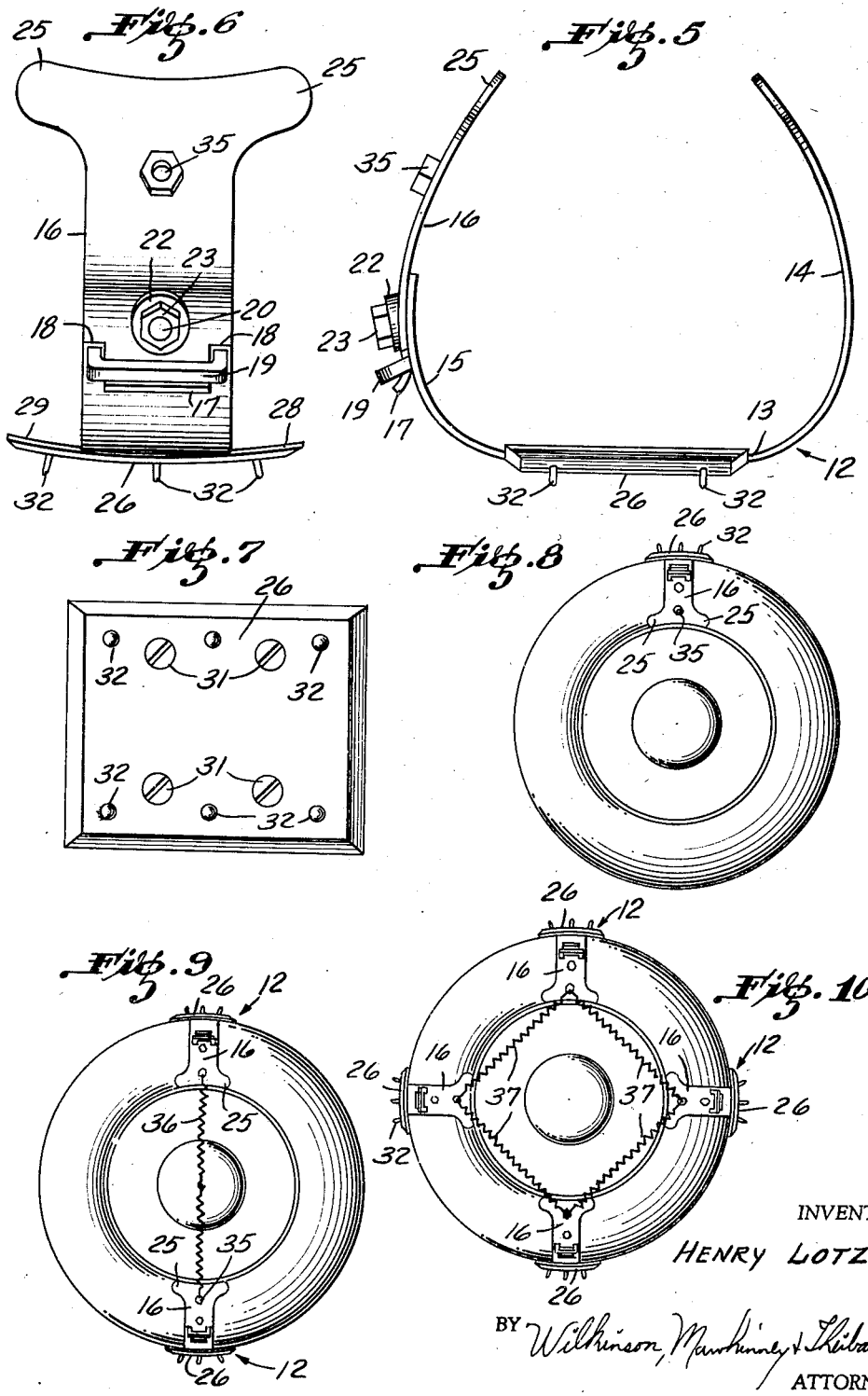
INVENTOR
HENRY LOTZ

United States Patent Office 2,864,423
Patented Dec. 16, 1958

2,864,423

SNOW AND ICE CLEAT

Henry Lotz, Boston, Mass.

Application December 18, 1956, Serial No. 629,108

3 Claims. (Cl. 152—230)

The present invention relates to snow and ice cleat and has for an object to provide an improved cleat for use on automobile tires and the like to afford traction and prevent slipping in ice and snow.

It is another object of the invention to provide a device which will be of strong and rigid construction yet capable of being easily applied over an inflated tire while conforming accurately thereto to avoid any substantial loose play and to insure that the cleat be carried around with the tire in the normal course of movement of the vehicle.

A further object of the invention is to provide an improved cleat for automobile tires to facilitate movement through ice and snow in which a shoe is provided substantially conforming to the cross-section of the tire and having a detachable section which may be connected to the shoe after the same has been applied to the tire whereby the cleat will hug the tire to avoid any relative movement of the cleat with respect to the tire which otherwise might result in abrasion and damage to the tire incident to the rotation of the cleat with the tire.

A still further object of the invention resides in providing an improved traction device for a vehicle tire in which an improved cleat plate is provided accommodating cleats or calks of variable sizes with means for detachably connecting the cleat plate to the shoe which extends about the rubber tire.

The invention further aims to provide a simple form of ice and snow cleat which can be produced at relatively small cost and can be applied to and removed from the tire in a minimum space of time with only a suitable wrench.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is an exploded isometric view of a snow and ice cleat constructed in accordance with the present invention.

Figure 2 is a fragmentary isometric view showing the applied and connected positions of the shoe and its tension plate.

Figure 3 is an isometric view from the underside of an improved form of cleat plate that may be employed in connection with the invention.

Figure 4 is a group side elevational view of cleats or calks of various sizes which may be employed in connection with the cleat plate.

Figure 5 is an end elevational view of the improved snow and ice cleat with the cleat plate assembled thereto and the tension plate in place.

Figure 6 is an end elevational view taken from the left end of Figure 5.

Figure 7 is a plan view of the outer side of the cleat plate.

Figure 8 is a side elevational view of an automobile tire showing a single snow and ice cleat of the invention applied thereto.

Figure 9 is a similar view showing two of the snow and ice cleats applied to a tire in positions of use with a tie spring connected diametrically across the tire to both such cleats.

Figure 10 is a view similar to Figure 9 showing four of the cleats of the invention applied to a single tire and connected together by four-way tie springs.

Referring more particularly to the drawings, 12 designates a spring steel shoe curved to tire size, which includes a tread portion 13, a long side wall, and a relatively short side 15. The tread 13 may be substantially flat while the long side wall 14 and the short side wall 15 are curved to conform generally to the curvature of the side walls of an automobile tire.

A tension plate 16 is adapted to complement the shoe 12 and to complete the same at the short side wall side thereof, such tension plate 16 being detachably connected to the short side wall 15 by suitable means, one of which is illustrated in the drawings. Such means may comprise a tongue 17 projecting from the plate having end shoulders 18 and a detent strap or clip 19 on the short side wall 15 to receive the tongue 16, such tension plate 16 having an aperture 21 adapted to fit over a threaded stud 20 outstanding from the free end portion of the short side wall 15.

After the aperture is fitted over the stud 20 a washer 22 is put in place and a nut 23 threaded over the outer end portion of the stud 20 as shown in Figure 2.

The long side wall 14 is provided at its free end with extension webs 24 while similar extension webs 25 are provided upon the free end portion of the tension plate 16. These extension webs 24, 25 are intended to extend along the side walls of the tire near the beads of the same.

As shown more particularly in Figures 3 and 7, a cleat plate 26 may be applied to the tread portion 13 of the shoe and in the instance shown such cleat plate 26 is provided on its underside with a central recess 27 having lateral extensions 28 and 29 and shoulders 30. As shown in Figure 1 the recess 27 is adapted to receive the tread portion 13 of the shoe with the shoulders 30 taking against the edge portions of said tread part. Countersunk machine screws 31 are engaged in tapped perforations 33 of the central portion of the plate 26, although these perforations 33 may be plain-walled as shown in Figure 3, the screws taking into tapped holes in the tread portion 13 of the shoe for the purpose of fastening the cleat plate to the shoe.

Gripping cleats 32 of selected sizes are welded or otherwise affixed to the outerside of the cleat plate 26 and its lateral extensions 28 and 29 which extend beyond both sides of the tread portion 13 of the shoe. A tapped hole 35 is also preferably provided in the tension plate 16 adjacent the extension webs 25 for receiving the tie spring 36 of Figure 9 or the tie springs 37 of of Figure 10.

In the use of the device, the shoe 12 in the condition shown in Figure 1, that is before the tension plate 16 is affixed thereto, is introduced over an inflated automobile tire and the tension plate 16 is thereupon applied thereto.

Now it will be noted, particularly from Figures 1 and 2 that the tongue 17 is curved reversely to the curvature of the tension plate 16 so that in applying the plate 16 such plate may be moved from a distance at the side of the tire directly toward that side of the tire with the tongue 17 in advance or leading so that the free end of this tongue 17 may be inserted under the starp or detent 19, and after this engagement has been made the tension plate 16 may be rotated upon the convex side of the tongue 17 which bears against the outer surface of the short side wall 15 of the shoe. In this way, only after interlocking engagement of the tongue 17 with the detent 19 is the tension plate 16 moved into final position against the side wall of the tire.

It will be obvious from Figure 5 that the gap between the free end of the long side wall 14 and the webs 25 of the tension plate 16 is too narrow to insert radially over the tread and outwardly bulging side walls of the tire. So that it is necessary to rock the tension plate 16 into the position of Figure 5 after the shoe has been put into place on the tire and after the engagement of the tongue 17 with the detent 19.

In executing these movements, the aperture 21 of the tension plate 16 will be brought over the threaded stud 20 on the side wall 15, and the outer end portion of the threaded stud 20 will project outwardly of the tension plate 16 so as to receive the washer 22 and outwardly thereof the nut 23, which latter may thereupon be tightened on the stud 20 to bind the tension plate 16 firmly in place on the short wall 15 and against the side wall of the tire. In this connection it will be noted that the washer 22 has thin and thick annular portions for the purpose of presenting to the curved surface of the tension plate 16 a tapered or beveled side of the washer to increase the conformity between the adjacent surfaces of these two parts.

It will be understood that the cleat plate 26 is detachable through the screws or other fastenings 31 and that cleat plate having cleats or calks of various sizes may be selected for special uses. Also cleat plates having different patterns of calks may be selected and applied and fastened to a shoe to meet particular conditions.

Referring to Figure 8, a single device according to the invention is shown as applied to the tire. A single device will easily remain upon the tire during the rotation thereof due to the detachability of the tension plate 16 and the fact that it hugs the side wall of the tire when finally rocked into position and securely fastened by the nut 23.

Referring more particularly to Figure 9, if desired, two of the cleats according to the invention may be applied to the tire. In so doing the application is preferably made of the two cleats at diametrically opposite portions of the tire so that a single tie spring 36 may be stretched taut in a diametric line across the tire, the tension of the spring tending to draw the two cleats together and to also prevent any outward radial casual or accidental movement of the same with reference to the tire.

Figure 10 shows a further application of the invention in which four of the cleats are mounted upon the tire displaced by approximately 90° angles. In such case springs 37 may be run from one cleat to an adjacent cleat. In this case the springs may follow chord lines rather than diametric lines across the tire or wheel.

As the wheel rotates, the cleats or forks 32 will be brought into contact with the ice or snow and will secure a firm grip upon the same preventing side slipping of the wheels and also preventing rotational slipping of the wheels so that excellent traction is afforded by the devices.

The device may be used on a double tire as well as a single tire.

The tension plate 16 may be attached to the holding strap 19 not only by the arrangement illustrated and described, but also by welding, bolting or the like. Also the cleat plate may be welded, bolted or otherwise applied to the shoe.

Although I have disclosed herein the best form of the invention known to me at this time, I reserve the right to all such modifications and changes as may come within the scope of the following claims.

What is claimed is:

1. A snow and ice cleat comprising a shoe having a tread portion, a long side wall and a short side wall, a tension plate curved to conform to a side wall of the tire and having a reversely curved tongue at one end thereof, a detent on the short wall for receiving such tongue therebeneath on its concave side with the convex side of the tongue rocking on the adjacent surface of the short side wall, and detachable means for retaining the tension plate to the short side wall and for moving the tension plate firmly up against the adjacent side wall of the tire.

2. A snow and ice cleat as claimed in claim 1 wherein said retaining means comprises a stud extending outwardly from the short side wall in spaced relation from the detent, said tension plate having an aperture receivable over the stud, and means detachably connected with the stud outwardly of the plate for moving the plate firmly against the adjacent side wall of the tire and maintaining the plate in place.

3. A snow and ice cleat as claimed in claim 2 wherein said tension plate moving and maintaining means comprises a nut threaded onto said stud and a washer on the stud between the nut and tension plate, said washer having a thin annular portion and a thick annular portion for presenting to the curved surface of the tension plate a tapered side to increase the conformity between the adjacent surfaces of the washer and the tension plate.

References Cited in the file of this patent

UNITED STATES PATENTS

| | | |
|---|---|---|
| 1,574,791 | Clark | Mar. 2, 1926 |
| 2,437,040 | Prevost et al. | Mar. 2, 1948 |
| 2,501,973 | Seymour | Mar. 28, 1950 |
| 2,525,367 | Miller | Oct. 10, 1950 |
| 2,643,697 | Shill | June 30, 1953 |